2,539,847

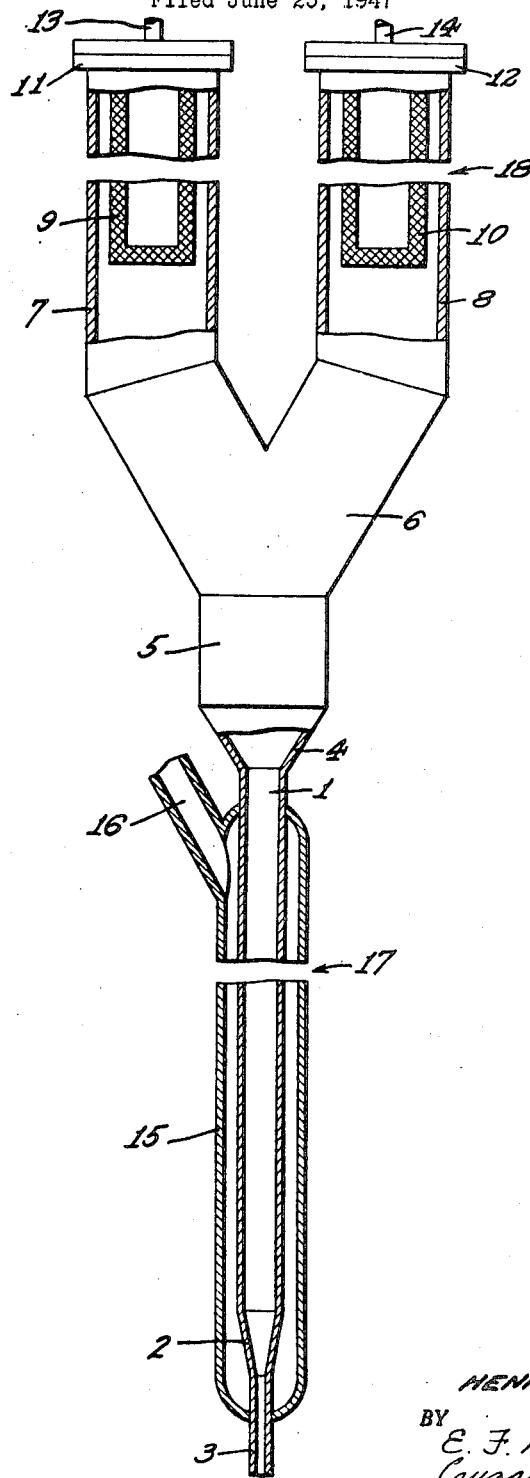
INVENTOR
HENRY G. McGRATH
BY
E. F. Riebrecht
Cruzan Alexander
ATTORNEYS Patented Jan. 30, 1951

UNITED STATES PATENT OFFICE 2,539,847

SYNTHESIS OF ORGANIC COMPOUNDS

Henry G. McGrath, Elizabeth, N. J., assignor to
The M. W. Kellogg Company, Jersey City, N. J.,
a corporation of Delaware Application June 25, 1947, Serial No. 756,949

4 Claims. (Cl. 260—449.6)

This invention relates to an improved process for hydrogenating carbon oxides to produce organic compounds. Particularly in one aspect this invention relates to the hydrogenation of carbon monoxide in the presence of finely divided fluidized catalyst comprising cobalt to produce oxygenated organic compounds. The improved process in this aspect involves reacting hydrogen and carbon monoxide under particular conditions and with a particular catalyst to produce a relatively large yield of oxygenated organic compounds. The improved process is applicable also in reacting hydrogen with other organic compounds containing the carbonyl group and herein designated as "carbon oxides," such as carbon dioxide, ketones, anhydrides, acyl halides, organic acids and their salts and esters, acid anhydrides, and amines. In the following description of the invention the hydrogenation of carbon monoxide will be referred to specifically. It will be understood, however, that the invention is of wider application including within its scope the hydrogenation of any suitable carbon oxide or mixtures thereof.

It has been known for some time that hydrogen and carbon monoxide may be made to react exothermically in the presence of catalyst under specific reaction conditions to form organic compounds. In general, the synthesis of these organic compounds by the hydrogenation of carbon monoxide is accomplished in the presence of a metal or an oxide of metal chosen from group VIII of the periodic table as catalyst at pressures below about 500 pounds per square inch and at temperatures below about 750° F. for the production of hydrocarbons, and, generally, at pressures above about 1000 pounds per square inch and at temperatures above about 750° F. for the production of oxygenated organic compounds as a major component of the process.

The synthesis feed gas or reaction mixture comprises a mixture of about 1 to 2 mols of hydrogen per mol of carbon monoxide and may be prepared by various means including the catalytic conversion of natural gas, steam, and carbon dioxide.

It is an object of this invention to provide a process for the synthesis of organic compounds. Another object of this invention is to provide a process for the production of oxygenated organic compounds in a relatively high yield by the hydrogenation of a carbon oxide in the presence of a hydrogenation catalyst.

Still another object of this invention is to provide a novel catalyst for the hydrogenation of a carbon oxide.

It is still a further object of this invention to provide a particular novel catalyst adapted to the fluidized process for the hydrogenation of carbon monoxide to produce oxygenated organic compounds, such as alcohols.

Various other objects and advantages will become apparent to those skilled in the art from the accompanying description and disclosure.

Much to my surprise I have discovered that a carbon oxide can be hydrogenated with a hydrogenation catalyst comprising cobalt at relatively low pressures to produce oxygenated organic compounds. According to the present invention, carbon monoxide and hydrogen are made to react at a pressure below about 500 pounds per square inch gage and under suitable conditions of temperature and space velocity in the presence of a catalyst comprising cobalt such that the products of reaction comprise above about 15 per cent by weight and may even be higher than 40 per cent by weight of oxygenated organic compounds. Generally for best results a mixture of hydrogen and carbon monoxide in a mol ratio between about 1:1 and about 3:1 is contacted with a cobalt catalyst promoted with thoria at a pressure between about 150 and about 500 pounds per square inch gage and at a temperature between about 250° F. to 650° F. under conditions of residence time of the reactants and products of reaction sufficient to produce a relatively high yield of oxygenated organic compounds. Generally, for conversion of the major proportion of the carbon monoxide, the contact time between the catalyst and the gases and reaction products is at least 5 seconds per pass. At pressures of about 500 pounds or above, the cobalt catalyst forms a stable compound of cobalt carbonyl which volatilizes. The volatilization of the cobalt carbonyl results in a substantial loss of catalyst from the reaction zone; and, for one reason, it is desirable to maintain the pressure of reaction below about 500 pounds per square inch, preferably below about 300 pounds per square inch gage. At pressures below about 500 pounds per square inch cobalt carbonyl is not formed to any great degree. At pressures below about 150 pounds per square inch gage the yield of oxygenated organic compounds falls off rapidly to only a negligible yield; and, therefore, it is essential to maintain a pressure above 150 pounds per square inch.

It has also been found, according to this invention, that in order to obtain maximum conversion of carbon monoxide to oxygenated organic compounds, the catalyst must be suspended in a fluidized condition in the form of finely divided particles in a mixture of the reactants as such operation enables close temperature control at any desired level. In suspending the cobalt catalyst in the fluidized condition in a gaseous mixture of the reactants, it is highly desirable to use the catalyst in a finely divided condition supported upon a bentonite type clay, such as "Filtrol" or "Super-Filtrol." "Super-Filtrol" is a bentonite type clay which has been treated with sulphuric or hydrochloric acid under conditions to remove substantially all of the impurities in the clay. The preferred embodiment of the present invention involves flowing a gaseous mixture comprising hydrogen and a carbon oxide through a reaction zone in contact with a suspended mass of finely divided catalyst comprising cobalt supported upon "Super-Filtrol" and promoted with thoria in order to produce a maximum yield of oxygenated organic compounds. The hydrogen and carbon oxide reactant are passed as gases through the reaction zone under conditions effective to react all or a major proportion of the carbon oxide reactant. The gaseous mixture of reactants and reaction products is passed through the mass of finely divided catalyst at a linear gas velocity sufficient to suspend or entrain the catalyst mass in the gas stream. Preferably, the linear velocity of the gas stream passing through the reaction zone is upward and is sufficiently low to maintain the catalyst mass in a dense fluidized pseudo-liquid condition. However, the velocity may be sufficiently high to entrain all or a substantial portion of the finely divided catalyst in the gas stream to form a continuous catalyst phase which circulates with the flowing gas stream without departing from the scope of this invention. In the former condition in which the gaseous mixture is passed upward through the catalyst mass, the catalyst mass may be said to be suspended in the gas stream but not entrained therein in the sense that there is movement of the catalyst mass as such in the direction of flow of the gas stream. When operating with a catalyst in the pseudo-liquid condition, it is preferred to maintain the upward velocity in the gas stream sufficiently high to maintain the fluidized catalyst mass in a highly turbulent condition in which the catalyst particles circulate at a high rate within the pseudo-liquid mass. In this pseudo-liquid condition of operation a small proportion of the catalyst in the fluidized mass may be entrained in the gas stream emerging from the upper surface of the gas stream whereby catalyst thus entrained is carried away from the mass.

In effecting the hydrogenation of the carbon monoxide to produce oxygenated organic compounds by employing a finely divided cobalt catalyst suspended in a pseudo-liquid condition in the recation zone, the preferred specific operating conditions are approximately as follows: a pressure between about 200 and about 300 pounds per square inch gage, a temperature between about 350° F. and 450° F. and a space velocity equivalent to a charging rate between about 100 and 5000 volumes of combined or total feed gas per hour per volume of catalyst in the dense phase, more preferably a space velocity between about 500 and about 800.

The catalyst employed to obtain oxygenated organic compounds as a product of the hydrogenation is cobalt promoted with thoria and supported on a bentonite type clay. Preferably, the catalyst consists of one part cobalt, between about 0.05 and about 0.5 part thoria and between about 0.5 and about 3 parts "Super-Filtrol." In this specification and claims the catalyst employed is described by reference to its chemical condition and composition when first contacted with reactants. After use of the catalyst various components of the catalyst may become partially oxidized and/or reduced and various carbonaceous deposits may accumulate upon the catalyst.

The catalyst is employed in a fine state of subdivision. Preferably, the powdered catalyst initially contains no more than a minor proportion by weight of material whose particle size is greater than 250 microns. Preferably, also, the greater proportion of the catalyst mass comprises material whose particle size is smaller than 100 microns, including at least 25 weight per cent of the material in particle sizes smaller than 40 microns. A highly desirable powdered catalyst comprises at least 75 per cent by weight of material smaller than 150 microns in particle size, and at least 25 per cent by weight smaller than about 40 microns in particle size.

In the preferred form of the invention with the catalyst present in a pseudo-liquid condition, the powdered catalyst mass is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the catalyst concentration is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. The latter is the velocity at which the gas stream would flow through the reactor in the absence of catalyst. In the dense phase the concentration of the catalyst in the gas stream varies from a maximum near the gas inlet to a minimum in the upper part of this phase. Likewise the concentration of catalyst in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This zone has the appearance of an interface between two visually distinct phases.

This dense phase operation ordinarily involves employment of catalyst powders and gas velocities such that a relatively small portion of the dense fluidized catalyst mass is carried away by entrainment, and it is necessary, therefore, to provide means in the reactor for separating such entrained catalyst and returning it to the dense phase, or to provide means externally of the reactor to separate entrained catalyst from the gaseous effluent and return it to the reactor, or otherwise to recover catalyst from the gaseous effluent.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The linear velocity of the gas stream passing upward through the dense phase is conveniently expressed in terms of the superficial velocity, which is the linear velocity the charge gas stream would assume if passed through the reactor in the absence of catalyst. This superficial velocity takes into account the shrinkage in volume caused by the reaction and is, preferably, in the range of from 0.1 to 10 feet per second. When operating with a continuous catalyst phase in which the catalyst is entrained in the flowing gaseous mixture, velocities as high as 40 feet per second may be used.

In hydrogenating carbon monoxide according to the preferred embodiment of this invention, unconverted hydrogen and/or carbon monoxide are recycled in a ratio of combined or total feed to fresh feed between about 1:1 and about 5:1. The recycle gas containing hydrogen and/or carbon monoxide may additionally contain normally gaseous and normally liquid components of the reaction effluent. A conversion of carbon monoxide between about 70 and about 100 per cent has been observed when using such a recycle ratio. A yield of oil between about 97 and about 126 cc. per cubic meter of fresh feed gas and a yield of water between about 99 and about 171 cc. per cubic meter of fresh feed gas, respectively, have been obtained under the preferred operating conditions of this invention. The overall yield of oxygenated organic compounds obtained from both the hydrocarbon and water products is between about 33 and about 40 cc. per cubic meter of fresh feed gas. A major proportion of the oxygenated organic compounds is alcohols and only a relatively minor proportion is acids, aldehydes, ketones, and esters.

According to a modification of the present invention a normally liquid fraction recovered as a product of the process may be recycled to the reaction zone. Such a normally liquid fraction may comprise, conveniently, a light naphtha fraction recovered from the effluent of the process. Instead of a light naphtha, a higher or lower boiling fraction may be employed so long as the liquid fraction is vaporizable under the conditions of operation in the reaction zone. Recycling of the normally liquid fraction aids in the cooling of the reaction zone by the vaporization thereof and also results in a substantially increased yield of organic compounds having more than one carbon atom per molecule. Especially when the liquid fraction contains unsaturated and oxygenated organic compounds, the yield of valuable products, such as alcohols, is increased. The normally liquid fraction may be injected into the feed line to the reaction zone or directly into the reaction zone itself without departing from the scope of this invention.

The feed mixture to the reaction zone, as previously stated, comprises hydrogen and carbon monoxide in the previously indicated ratios. However, in most instances relatively non-reactive ingredients may also be contained in the feed mixture. Such ingredients comprise nitrogen, methane, and other saturated hydrocarbons. Since the feed gas contains such ingredients as nitrogen, it is necessary in most instances to vent or discard a portion of the recycle gas in order to prevent a build-up of nitrogen in the system.

Generally, upon extended and prolonged use of the catalyst it becomes necessary to regenerate or revivify the catalyst as a result of the accumulation of carbonaceous deposits thereon and the deactivation of the catalyst itself. The carbonaceous deposits may be removed from the catalyst and the catalyst reactivated by treating the catalyst with an oxidizing and/or reducing gas. In oxidizing the catalyst the catalyst is contacted with an oxygen-containing gas at a temperature above about 800° F. and in treating the catalyst under reducing conditions the catalyst is contacted with a reducing gas, such as hydrogen, at a temperature between about 600° F. and about 800° F. After regeneration the catalyst is returned to the reaction zone for re-use in the hydrogenation of carbon monoxide, according to the present invention.

The preferred cobalt-thoria-"Super-Filtrol" catalyst of the present invention has a bulk or settled density of about 80 to 100 pounds per cubic foot in the fresh condition. Initially, the density or concentration of the catalyst in the reaction zone in the pseudo-liquid dense phase is about 30 to 60 pounds per cubic foot of gas and upon extended use, depending upon the amount of carbonaceous deposits thereon, may become as low as about 15 or 25 pounds per cubic foot of gas.

As used in this specification and claims the phrase "suspending the catalyst in a fluidized condition" has reference to the catalyst either when it is in the pseudo-liquid dense phase or when it is entrained and circulates in a continuous phase through the reaction zone.

The invention will be described further by reference to the accompanying drawing which is a view in elevation, partly in section, of a reactor employed in carrying out the present invention by a pseudo-liquid operation, and by reference to specific examples of operations embodying the present invention and carried out in apparatus exemplified by the drawing.

Referring to the drawing, reactor 1 consists of a length of extra heavy 2-inch steel pipe which is about 153 inches long and has inside and outside diameters of 1.95 inches and 2.50 inches, respectively. Reactor 1 is connected by a conical section 2 to an inlet pipe 3 made of extra heavy half-inch steel pipe having an inside diameter of 0.55 inch. Reactor 1 is connected by a conical section 2 to an inlet pipe 3 made of extra heavy half-inch steel pipe having an inside diameter of 0.55 inch. Reactor 1 is connected at the top, by means of a conical section 4, with an enlarged conduit 5 comprising a length of 6-inch extra heavy steel pipe having an inside diameter of 5.76 inches. Conical section 4 and conduit 5 constitute an enlarged extension of reactor 2 which facilitates disengagement of catalyst from the gas stream after passage of the latter through the dense catalyst phase.

Conduit 5 is connected by means of a manifold 6 with conduits 7 and 8 which comprise other sections of extra heavy 8-inch steel pipe. Conduits 7 and 8 contain filters 9 and 10 which are constructed of porous material which is permeable to the gas and vapors emerging from the reaction zone but impermeable to the catalyst particles carried by entrainment in the gas stream. Filters 9 and 10 are cylindrical in shape and closed at the bottom ends. They are dimensioned in relation to conduits 7 and 8 to provide a substantial annular space between the filter and the inner wall of the enclosing conduit for the passage of gases and vapors and entrained catalyst upwardly about the outer surface of the filter. The upper ends of filters 9 and 10 are mounted in closure means 11 and 12 in a manner whereby the gases and vapors must pass through either filter 9 or filter 10 to reach exit pipes 13 and 14. Each of filters 9 and 10 is approximately 36 inches long and 4½ inches in outside diameter, the filter walls being approximately ¾ of an inch thick.

The greater part of reactor 1 is enclosed in a jacket 15 which extends from a point near the top of reactor 1 to a point sufficiently low to enclose the 3-inch length of conical section 2 and approximately 5 inches of pipe 3. Jacket 15 comprises a length of extra heavy 4-inch steel pipe having an inside diameter of 3.83 inches. The ends of jacket 15 are formed by closing the ends of the 4-inch pipe in any suitable manner, as shown. Access to the interior of jacket 15 is provided by an opening 16 in the top thereof through a 2-inch steel pipe. Jacket 15 is adapted to contain a body of liquid for temperature control purposes, such as water or Dowtherm. The vapors which are evolved by the heat of reaction are withdrawn at 16, condensed, and returned to the body of temperature control fluid in jacket 15. The condensate returned to jacket 15 may be introduced through line 16, or directly at a low point, adjacent pipe 3, by an inlet means not shown. The temperature control fluid in jacket 15 is maintained under a pressure at which the liquid boils at the temperature desired in jacket 15. Heating coils, not shown, are provided in connection with jacket 15 to maintain the temperature control fluid therein at any desired temperature when it is desired to heat the contents of reactor 1.

In order to show all the essential parts of the reactor and associated catalyst separation means on a single sheet, a large proportion of the apparatus has been eliminated by the breaks at 17 and 18. For a clear understanding of the relative proportions of the apparatus, reference may be had to the over-all length of the apparatus, from the bottom of jacket 15 to exit pipes 13 and 14, which is about 224 inches. In each of breaks 17 and 18 the portion of the apparatus eliminated is identical with that portion shown immediately above and below each break.

In pseudo-liquid operations carried out in this apparatus the catalyst recovery means, comprising filters 9 and 10, are effective to separate substantially completely entrained catalyst from the outgoing stream of gases and vapors. The disengagement of solids from the gas stream is promoted by the lowered velocity of the gas stream in conduit 5 and remaining solids are separated on the outer surfaces of filters 9 and 10. The latter are employed alternatively during the operation so that the stream of gases and vapors and entrained solids passes from conduit 5 through either the left or right branches of manifold 6 into conduit 7 or conduit 8. During the alternate periods the filter which is not in use is subjected to a back pressure of gas which is introduced at a rate sufficient to dislodge catalyst which has accumulated on the outer surface of the filter during the active period. Such blow-back gas and dislodged catalyst flows downward in the conduit enclosing the filter and into manifold 6, in which the blow-back gas is combined with the reaction mixture flowing upward from conduit 5. The greater part of the catalyst thus dislodged settles downward into the reactor and is thus returned for further use.

The amount of catalyst charged to the reactor initially is regulated, with reference to any preliminary treatment of the catalyst in the reactor and the gas velocity to be employed, whereby the upper level of the dense phase is substantially lower than the top of reactor 1. During the operation the accumulation of deposited reaction products on the catalyst particles may cause an expansion of the dense phase and a rise in the height of the dense phase.

In the operation of the apparatus of the drawing, the desired quantity of powdered catalyst is introduced directly into the reactor through a suitable connection, not shown, in conduit 5. After any desired preliminary activation treatment the temperature of the fluid in jacket 15 is adjusted, by the heating means mentioned above and by the pressure control means, to the temperature desired in jacket 15 during the reaction. After the catalyst mass has reached the reaction temperature the introduction of the reaction mixture through pipe 3 is initiated. During the reaction the liquid in jacket 15 is maintained at the desired temperature by controlling its pressure. The reaction mixture may be preheated approximately to the reaction temperature prior to its introduction through pipe 3, or the reactants may be heated to the reaction temperature through the passage thereof through that portion of pipe 3 which is enclosed by jacket 15 and by contact with the hot catalyst. In most of the operations described hereinafter it was preferred to preheat the reaction mixture to temperatures of at least 350° F.

Pipe 3 is dimensioned with respect to reactor 1 and the desired superficial velocity whereby the velocity of the gases passing through pipe 3 is sufficiently high to prevent the passage of solids downward into pipe 3 against the incoming gas stream. A ball check-valve, not shown, is provided in pipe 3 to prevent solids from passing downward out of the reactor when the gas stream is not being introduced into pipe 3.

In this apparatus operating runs were made to test the efficacy of the catalyst of this invention in the treatment of a gas charge containing hydrogen and carbon monoxide to convert these reactants to hydrocarbons and oxygenated organic compounds. The results of each operating run are represented by the results observed during a stabilized period of operation under a given combination of operating conditions. The conditions of operation and the results obtained in these operating runs are described below in the following example and tables.

The results obtained when using the catalysts prepared according to this invention are presented in the example in conventional tabular form. The contraction, yield of observed oil and water may be taken as indications of catalyst activity. The yield of observed oil represents the product collected in the primary receiver at 300° F. and operating pressure and in the secondary receiver at about 70° F. and operating pressure. This yield of oil is not the total yield of organic compounds since it does not include most of the gaseous hydrocarbons made or the organic compounds soluble in the water product. The yield of observed water represents the aqueous layer recovered in the primary and secondary receiver and includes the organic compounds soluble therein.

The inspections on the oil and water were obtained by conventional methods of analysis and these data may be used as a measure of catalyst selectivity. The unsaturate content of the oil is calculated and reported as the "mol per cent monoolefins" although there may be some diolefins present. The "weight per cent water—KFR" is obtained by use of the Karl Fischer Reagent (KFR) and the difference between that value and 100 per cent is a measure of the organic chemicals (oxychemicals) contained in the observed water product. All of the oxygenated organic compounds (acids, alcohols, aldehydes, ketones, etc.) are not present in the observed water but a considerable quantity are present also in the observed oil product. In addition to oxygenated chemicals in the oil and water, some low molecular weight oxygenated chemicals are present in the exit gas leaving the secondary receiver and these chemicals may be recovered therefrom.

EXAMPLE

A catalyst was prepared in accordance with the following procedure. A cobalt nitrate and thorium nitrate solution was prepared by dissolving 12,600 grams of $Co(NO_3)_2 \cdot 6H_2O$ and 1,325 grams of $Th(NO_3)_2 \cdot 4H_2O$ in 22.5 gallons of water. A sodium carbonate solution was prepared by dissolving 8,070 grams of $Na_2CO_3 \cdot H_2O$ in 22.5 gallons of water. The solutions were heated to a temperature of about 185° F. to 190° F. The solution of cobalt nitrate and thorium nitrate was added with stirring to the sodium carbonate solution over a period of about ten minutes. After stirring, about 2,520 grams of "Super-Filtrol" preheated to about 180° F. were added to the resulting solution with vigorous stirring over a period of about 3 minutes. The resulting slurry obtained by adding the "Super-Filtrol" was filtered in a filter press to form filter cakes. The filtering took about one hour. The filter cakes were washed with 270 gallons of hot water. The filter cakes were removed from the press and reslurried in 120 gallons of hot water and immediately refiltered. The ignition loss on the wet cake from the filter press was about 80 per cent. The wet cake was placed in a drying oven at 210° F. for sixteen hours. The ignition loss from the dry cake was about 27 per cent. Thereafter the dry filter cake was partly crushed in a braun disc mill and screened to about 4 to 10 mesh. The fines were pelleted to about ¼ inch diameter pellets. About 3600 grams of the catalyst constituted 4 to 12 mesh fragments and about 3900 grams constituted about ¼ inch pellets. Both fragments and pellets were charged to a hydrogen recirculating furnace for reduction of the catalyst. The catalyst was reduced at a maximum temperature of about 750° F. for about five hours until the formation of water ceased. The reduction of the catalyst was continued for about ½ hour after formation of the water ceased. The reduced fragments and pellets were ground to about 80 mesh in a coffee grinder. The coffee grinder was fitted so that a stream of $CO_2$ was continuously passed through the apparatus in order that the grinding might be effected in an inert atmosphere. After reduction the catalyst composition in parts by weight was one part Co, 0.25 part $ThO_2$ and one part "Super-Filtrol." The following is a screen analysis of the reduced catalyst powder.

TABLE I

| Screen Size | Weight Per Cent | Cum. Wt. Per Cent |
|---|---|---|
| +40 mesh | 0.5 | 0.5 |
| −40+100 | 1.9 | 2.4 |
| −100+140 | 12.7 | 15.1 |
| −140+200 | 0.5 | 15.6 |
| −200+Pan | 84.4 | 100.0 |

About 6.5 pounds of this material was charged to reactor 1 as illustrated in the drawing. The unit was flushed out with hydrogen through pipe 3. Jacket 15 was filled with a suitable temperature control fluid, such as water. Thereafter, the introduction of a feed gas consisting approximately of two mols of hydrogen per mol of carbon monoxide was initiated at a space velocity of about 500 standard volumes of fresh feed gas per hour per volume of dense catalyst phase and the temperature was raised rapidly to the desired reaction temperature. The linear velocity of the gases passing upward through reactor 1 was sufficiently low such that a pseudo-liquid dense phase of catalyst was formed in the reaction zone whereby the catalyst particles achieve a high degree of turbulence within the dense phase.

An effluent was removed from reactor 1 and unreacted reactants and products of the process were separated therefrom. The reaction products were recovered for the most part by cooling the reaction mixture to room temperature to obtain a condensate and subsequently passing uncondensed gases through an absorbent, such as activated charcoal. The condensate comprised both oil and water product fractions. Both the oil fraction and the water product fraction contained substantial amounts of oxygenated compounds. The absorbed products were recovered by steam distillation which yielded a light naphtha fraction, condensed water, and a gaseous fraction. The water contained additional oxygenated compounds. The gaseous fraction was almost entirely hydrocarbons having three to five carbon atoms per molecule. The yield of the various fractions was determined by measurement of the condensed product and by absorption and combustion analysis of the gas from the condensing unit. Oxygenated compounds were recovered in most instances from the products by distillation of the water product, by extraction of the condensed oil with ethylene glycol or methanol and by water scrubbing the gaseous fraction. The quantity of alcohols in the condensed oil was determined by titration with acetyl chloride. The recovery of oxygenated organic products from the synthesis effluent is discussed in considerably more detail in co-pending applications, Serial Numbers 709,871, now Patent No. 2,470,782, and 709,872, filed November 14, 1946, of which I am a co-inventor. It is believed, therefore, that it is unnecessary to discuss the recovery of the oxygenated products in detail in this application since reference may be made to the aforesaid co-pending applications if necessary.

Table II is a tabulation of the operating conditions and results obtained for several runs using the cobalt-thoria-"Super-Filtrol" catalyst of the present invention.

TABLE II

| Runs | 1 | 2 | 3 | 4 |
|---|---|---|---|---|
| Hours on Condition | 20 | 4 | 8 | 28 |
| Operating Conditions: | | | | |
| Av. Catalyst Temp. °F | 435 | 433 | 435 | 439 |
| Outlet Pressure, p. s. i | 150 | 250 | 250 | 250 |
| Recycle Ratio [1] | 1.8 | 2.2 | 2.4 | 2.7 |
| Space Velocity— | | | | |
| V./Hr./V | 560 | 820 | 670 | 650 |
| Cf./Hr./lb. Co | 17.1 | 36.7 | 28.1 | 29.2 |
| Bed Conditions: | | | | |
| Bed Height, feet | 7.1 | 6.6 | 6.2 | 6.6 |
| Lbs. Catalyst in Reactor | 6.5 | 6.0 | 6.0 | 6.0 |
| Catalyst Density, lbs./ft.$^3$ | 45.5 | 45.5 | 48.0 | 45.5 |
| Average Velocity, ft./sec | 0.32 | 0.32 | 0.27 | 0.31 |
| Superficial contact time, Sec | 22 | 21 | 23 | 21 |
| Analysis—Combined Inlet Gas, Volume Percent: | | | | |
| $H_2$ | 57.7 | 53.9 | 41.2 | 56.5 |
| CO | 29.5 | 29.0 | 21.8 | 32.0 |
| $CO_2$ | 1.3 | 3.5 | 7.0 | 1.9 |
| Analysis—Fresh Feed, Volume Percent: | | | | |
| $CO_2$ | 0.7 | 0.4 | 0.8 | 1.0 |
| CO | 30.8 | 32.2 | 32.8 | 32.6 |
| $H_2$ | 61.5 | 63.5 | 61.8 | 62.0 |
| $CH_4$ | 6.1 | 3.7 | 4.4 | 4.4 |
| $C_2$ | 0.8 | 0.1 | 0.2 | |
| $C_3$ | | | | |
| $C_4$ | 0.1 | | | |
| Molecular Weight | 11.4 | 11.0 | 11.5 | 12.5 |
| Results (Basis: Fresh Feed): | | | | |
| Contraction, Vol. Percent | 60.3 | 74.0 | 73.4 | 59.2 |
| CO Conversion, Percent | 73.0 | 90.0 | 100.0 | 76.9 |
| Observed Oil, cc./m$^3$ | 51 | 63 | 64 | 46 |
| Total Oil, cc./m$^3$ | 96 | 126 | 125 | 97 |
| Observed Water: | | | | |
| cc./m$^3$ | 99 | 139 | 171 | 105 |
| Wt. Percent K. F. R | 83.0 | 91.2 | 94.7 | 86.5 |
| Oxygenated Organic Compounds— Water Phase: | | | | |
| Wt. per cent K. F. R | 17.0 | 8.8 | 5.3 | 13.5 |
| cc./m$^3$ (Fresh Feed) | 21 | 15 | 11 | 18 |
| Oil Phase: cc./m$^3$ (Fresh Feed) | 16.5 | 22 | 22 | 22 |
| Total in Water+Oil, cc./m$^3$ (Fresh Feed) | 37.5 | 37 | 33 | 40 |
| CO Distribution: | | | | |
| CO →$CO_2$, per cent | 1.9 | 8.3 | 12.5 | 1.8 |
| CO →$CH_4+C_2$ | 5.9 | 16.7 | | 10.7 |
| CO →$C_3+C_4$ | 9.4 | 14.2 | | 12.4 |
| CO →$C_5+$ Oxygenated Compounds | 82.8 | 60.8 | | 75.1 |
| Wax: | | | | |
| Wt. Per Cent Heavy Oil | 0.5 | 1.0 | Trace | 0.8 |
| Yield, gm./m.$^3$ (fresh feed) | 0.2 | 0.5 | | 0.2 |
| Melting Point, °F | 122 | 131 | | 130 |
| Liquid Distribution (100% $C_3$): | | | | |
| $C_3$, Vol. Per Cent | 15.6 | 26.2 | | 22.7 |
| $C_4$ | 8.3 | 9.5 | | 8.2 |
| $C_5$, 400° F | 61.5 | 51.6 | | 58.8 |
| 400° F+ | 14.6 | 12.7 | | 10.3 |
| Diesel Oil (350° F.+) (cc./m$^3$ fresh feed) | 19.0 | 22.0 | 20.0 | 14.0 |
| Inspections of Heavy Observed Oil: | | | | |
| Gravity, °API | 55.1 | 60.7 | 66.0 | 55.2 |
| ASTM Distillation— | | | | |
| I. B. P., °F | 148 | 117 | 109 | 123 |
| 10% | 170 | 164 | 158 | 162 |
| 50% | 300 | 287 | 278 | 282 |
| 90% | 530 | 530 | 499 | 522 |
| E. P | 612 | Crkd | Crkd | 634 |
| Olefins, Per Cent (mol per cent monoolefins) | 17 | 12 | 8 | 16 |
| Adsorber Naphtha Inspections: | | | | |
| Gravity, °API | 72.0 | 75.5 | | 77.8 |
| ASTM Distillation— | | | | |
| I. B. P., °F | 104 | 96 | | 93 |
| 10% | 133 | 123 | | 114 |
| 30% | 157 | 146 | | 130 |
| 50% | 191 | 180 | | 150 |
| 70% | 235 | 239 | | 187 |
| 90% | 311 | 308 | | 290 |
| E. P | 400 | 390 | | 379 |
| Olefins, per cent (mol per cent monoolefins) | 42 | 27 | | 37 |
| R. V. P., p. s. i | 8.8 | 14.5 | | 15.8 |
| Unsaturation of Gaseous Fractions (mol per cent monoolefins): | | | | |
| $C_2$ | | 9 | | |
| $C_3$ | 7 | 14 | | 27 |
| $C_4$ | 39 | 18 | | 26 |

[1] Total feed: fresh feed.

Under the operating conditions shown in Table II the conversion with the cobalt-thoria-"Super-Filtrol" catalyst in a fluidized condition ranged from 73 to 100 per cent and resulted in total oil yields of about 96 to 126 cc./m.$^3$ and a total water yield of about 99 to 171 cc./m.$^3$. Particularly to be noted are the oxygenated compound yields of from about 11 to 21 cc./m.$^3$ recovered from the water phase and from about 16 to about 22 cc./m.$^3$ recovered from the oil phase. The yields of oil and water increased with conversion but the effect on the oxygenated organic compounds was quite the reverse. For example, a comparison of the three experiments at 250 p. s. i. reveals that the yield of oxygenated organic chemicals was 40 cc./m.$^3$ at 77 per cent CO conversion, 37 cc./m.$^3$ at 90 per cent CO conversion, and only 33 cc./m.$^3$ at 100 per cent CO conversion. Expressing the results from these three tests on the basis of 1 m.$^3$ of synthesis gas reacted, the corresponding yields are 52, 41, and 33 cc./m.$^3$ respectively which indicates the yield of oxygenated organic compounds is inversely proportional to the conversion over that range. From this it is concluded that for optimum yield of oxygenated organic chemicals the overall carbon monoxide conversion with or without recycle should be less than 90 per cent.

It is also noted that the yield of the oxygenated organic chemicals was highest when the carbon d'oxide concentration of the net product gas was least. For example, in run 4 the $CO_2$ concentration was 3.5 per cent, in run 3 it was 19.5 per cent, and in run 2 it was 10.7 per cent. Therefore, it is desirable to operate with a negligible or relatively low $CO_2$ feed concentration, preferably less than about 2 per cent of $CO_2$ in the feed gas.

The yield of organic acids by the process of this invention was negligible.

The selectivity of the catalyst for liquid hydrocarbon ($C_3+$) production apparently changed very little under operating conditions although with increasing conversion the $C_3+C_4$ tended to be formed at the expense of the $C_5+$ hydrocarbons. The increase in conversion of about 20 per cent resulted in the $C_3+$ liquid hydrocarbons containing approximately 11 per cent more $C_3+C_4$ hydrocarbons. The olefin content of the product apparently increased with a decreasing ratio of $H_2$:CO. The inspections of heavy oil tabulated in Table II is the analysis of the oil contained in the primary and secondary receivers. The gravity of the heavy oil varied between about 55 and about 60 A. P. I. The initial boiling points of the heavy oil were 109° F. to 148° F. and the end points between about 612° F. and 634° F. with two samples cracking before the end points could be determined. The olefin content of the heavy oils varied from about 8 to 17 per cent.

The adsorber naphtha inspections is an analysis of the product obtained by passing the effluent gas from reactor 1 from the secondary receiver through a charcoal absorber. The charcoal absorber was steam stripped and then desorbed of its gasoline contents. The gravities of the naphtha were 72 to 77.8 A. P. I. The boiling ranges were approximately 95 to 390° F. and the olefin content varied between about 27 and about 42 per cent.

The concentration of the gaseous hydrocarbons is also shown in Table II. The $C_3$ hydrocarbon concentration varied between about 7 and about 27 per cent olefins and the $C_4$ hydrocarbons contained between about 18 to about 39 per cent olefins. There is an indication that the $H_2:CO$ ratio in the inlet gas affects the concentration of these hydrocarbons.

The Diesel oil had a Diesel index of about 100 or better.

Two sources from which the oxygenated compounds were recovered were the water from the primary and secondary receivers and from the condensate from the absorber, and the liquid oil phase. Part of the water from run 1 was salted out with $K_2CO_3$ and the organic layer obtained was 12.2 per cent by volume of the original water. This organic layer was charged to an 11 mm. 35 plate column and distilled. Three distinct plateaus were noted in the distillation curve. The first plateau indicated approximately 95 per cent ethyl alcohol and 5 per cent water. The second plateau indicated approximately 72 per cent normal propyl alcohol and the third plateau indicated normal propyl alcohol. Distillation was discontinued at approximately 87.5 overhead because of apparent decomposition in the still.

The organic oxygenated compounds in the oil phase were relatively water-insoluble alcohols of relatively high molecular weight, such as $C_6$ and $C_7$ alcohols.

During the hydrogenation of carbon monoxide in reactor 1 under the conditions of operation disclosed in Table II, oil, wax and fixed carbon are deposited slowly upon the catalyst. The data for the analysis of the material on the catalyst after 160 hours and after 254 hours of synthesis operation are tabulated in Table III below. It will be seen that the oil and wax was from about 2 to about 4 weight per cent and the carbon was from about 5 to about 6 weight per cent of the catalyst. At least a part of this carbon may have been present as cobalt carbide ($Co_2C$).

TABLE III

*Catalyst analysis*

After 160 hours operation:
Wt. per cent oil and wax _____ 3.6
Wt. per cent fixed carbon _____ 4.8
After 254 hours operation:
Wt. per cent oil and wax _____ 2.3
Wt. per cent fixed carbon _____ 5.9

Various modifications of the apparatus and specific conditions of reaction may become apparent to those skilled in the art without departing from the scope of this invention.

Having described my invention I claim:

1. A process for the hydrogenation of carbon monoxide to produce a relatively high yield of oxygenated organic compounds which comprises flowing a gaseous mixture comprising hydrogen and carbon monoxide as the principal reactants in a reaction zone through a mass of finely-divided contact material consisting essentially by weight of one part cobalt promoted with about 0.05 to about 0.5 part thoria and supported on about 0.5 to about 3 parts acid treated bentonite, passing said gaseous mixture through said mass at a velocity effective to suspend said mass in said gaseous mixture, maintaining a temperature of reaction between about 350 and about 450° F., a reaction pressure between about 150 and about 300 pounds per square inch gage and a carbon dioxide concentration of said gaseous feed mixture less than about two per cent, withdrawing a gaseous effluent from said reaction zone, recovering oxygenated organic compounds therefrom as products of the process, recovering also from said effluent a liquid hydrocarbon fraction containing a substantial amount of oxygenated organic compounds, and recycling said liquid hydrocarbon fraction containing the oxygenated organic compounds to said reaction zone to increase the yield of oxygenated organic compounds.

2. A process for the hydrogenation of carbon monoxide to produce a relatively high yield of oxygenated organic compounds which comprises flowing a gaseous mixture comprising hydrogen and carbon monoxide as the principal reactants upward in a reaction zone through a mass of finely-divided contact material consisting essentially by weight one part cobalt promoted with about 0.05 to about 0.5 part thoria and supported on about 0.5 to about 3 parts acid treated bentonite, passing said gaseous mixture through said mass at a velocity effective to suspend said mass in a fluidized condition, maintaining a temperature of reaction between about 350 and about 450° F. and a reaction pressure between about 150 and about 300 pounds per square inch gage, withdrawing a gaseous effluent from said reaction zone, recovering oxygenated organic compounds from said effluent as products of the process, separating also from said effluent a liquid hydrocarbon fraction containing a substantial amount of oxygenated organic compounds, and recycling said liquid hydrocarbon fraction containing the oxygenated organic compounds to said reaction zone to increase the yield of oxygenated organic compounds.

3. The process of claim 2, in which a liquid hydrocarbon fraction containing $C_6$ and $C_7$ alcohols is recycled to said reaction zone.

4. A process for the hydrogenation of carbon monoxide to produce at least about 15 per cent by weight of oxygenated organic compounds in the product of the process which comprises flowing a gaseous mixture comprising hydrogen and carbon monoxide as the principal reactants upward in a reaction zone through a mass of finely-divided contact material consisting essentially by weight one part cobalt, 0.25 part thoria and one part acid treated bentonite, passing said gaseous mixture through said mass at a velocity effective to suspend said mass in a fluidized condition, maintaining a temperature of reaction between about 350 and about 450° F., a reaction pressure between about 150 and about 300 pounds per square inch gage, a space velocity between about 500 and about 800 volumes of fresh feed gas per hour per volume of catalyst, and the conversion of carbon monoxide less than about 90 per cent, withdrawing a gaseous effluent from said reaction zone, cooling and condensing said reaction effluent to form a liquid aqueous phase and a liquid hydrocarbon rich phase, each of said phases containing oxygenated organic compounds produced by said process, recovering oxygenated organic compounds from said phases as products of the process, separating from said liquid hydrocarbon rich phase a liquid hydrocarbon fraction containing a substantial amount of oxygenated organic compounds, and recycling said liquid hydrocarbon fraction containing the oxygenated organic compounds to said reaction zone to increase the yield of oxygenated organic compounds.

HENRY G. McGRATH.

(References on following page)

REFERENCES CITED

The following references are of record in the file of this patent:

UNITED STATES PATENTS

| Number | Name | Date |
|---|---|---|
| 2,347,682 | Gunness | May 2, 1944 |
| 2,365,029 | Voorhies, Jr. | Dec. 12, 1944 |
| 2,381,709 | Apgar et al. | Aug. 7, 1945 |
| 2,398,899 | Teter | Apr. 23, 1946 |
| 2,417,164 | Huber, Jr. | Mar. 11, 1947 |
| 2,433,614 | Longley, Jr. | Dec. 30, 1947 |
| 2,447,505 | Johnson | Aug. 24, 1948 |

OTHER REFERENCES

Ellis: "The Chemistry of Petroleum Derivatives," vol II, page 1233 (1937), Reinhold Publishing Corp.